Figures 1, 18:
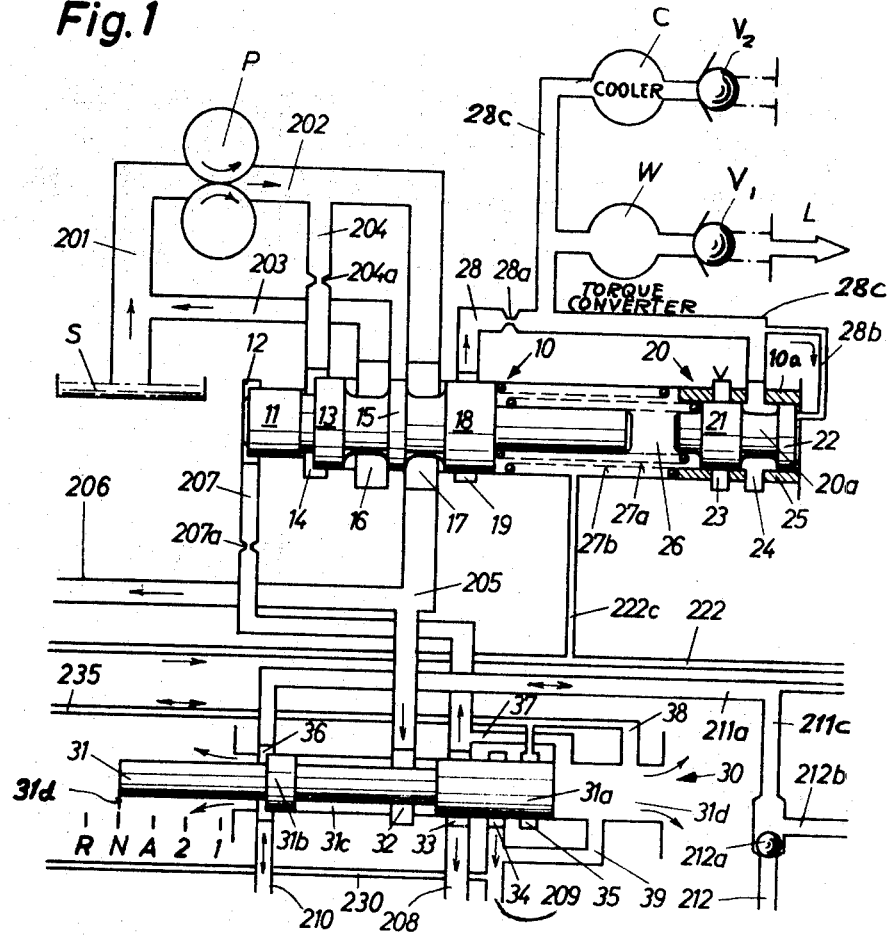

United States Patent

[11] 3,593,599

[72] Inventor Hansjorg Dach
 Friedrichshafen, Germany
[21] Appl. No. 845,464
[22] Filed July 28, 1969
[45] Patented July 20, 1971
[73] Assignee Zahnradfabrik Friedeichshafen
 Aktiengesellschaft
 Friedrichshafen, Germany
[32] Priority July 29, 1968
[33] Germany
[31] P 17 80 067.8
 Continuation-in-part of application Ser. No. 817,981, Apr. 21, 1969.

[54] HYDRAULIC GEAR-SHIFT CONTROL FOR AUTOMOTIVE TRANSMISSION SYSTEMS
 23 Claims, 22 Drawing Figs.
[52] U.S. Cl. .................................... 74/869,
 74/759
[51] Int. Cl. ..................................... B60k 21/10,
 F16h 57/10
[50] Field of Search ........................... 74/759, 869

[56] References Cited
 UNITED STATES PATENTS
3,287,995 11/1966 Leonard et al. ............... 74/869 X
3,295,387 1/1967 Leonard et al. ............... 74/869 X
3,296,884 1/1967 Leonard ........................ 74/869 X
3,438,285 4/1969 Hanzi et al. ................... 74/869
3,494,223 2/1970 Mori ............................. 74/869 X Primary Examiner—Arthur Y. McKeon
Attorney—Karl F. Ross ABSTRACT: Hydraulic oil from a motor-driven pump is fed to a main valve (10) which delivers it to a hydraulic torque converter (W), inserted between the drive motor and the transmission input shaft of an automotive vehicle, and to a set of fluid-operated clutches (K1, K2) and brakes (B1, B1F, B2) at a supply pressure determined by the stress of a pair of biasing springs (27a, 27b) and by the output pressure of a throttle valve (40) responding to the position of the vehicular accelerator. Two cascaded switching valves (70, 90), normally responding to speed-dependent fluid pressure from a regulator (PR) driven by the transmission output shaft, are biased by load-dependent fluid pressure from the throttle valve in a partly depressed position of the accelerator to create a hysteresis effect which permits switchover between first and second gears, and between second and third gears, at relatively high speeds during upshifting and at relative low speeds during downshifting, the hysteresis effect being partly canceled in a fully depressed (kickdown) throttle position; upon the shifting of a speed selector (30) from "automatic" position (A) to a manual position "1" or "2," this load-dependent bias on either or both switching valves is overridden by a fixed fluid pressure from either of two blocking valves (50, 60). Dampers (120, 140, 160, 170) are provided to control the rate of activation of the hydraulic clutches and brakes.

Figure 2:
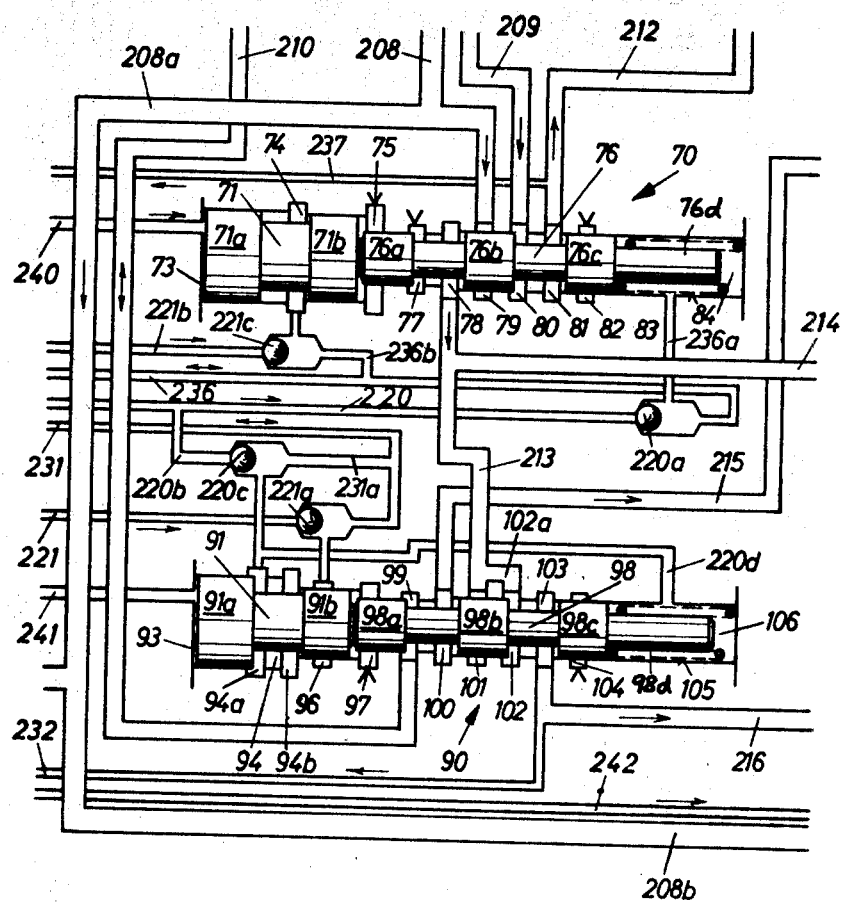
Figure 3:
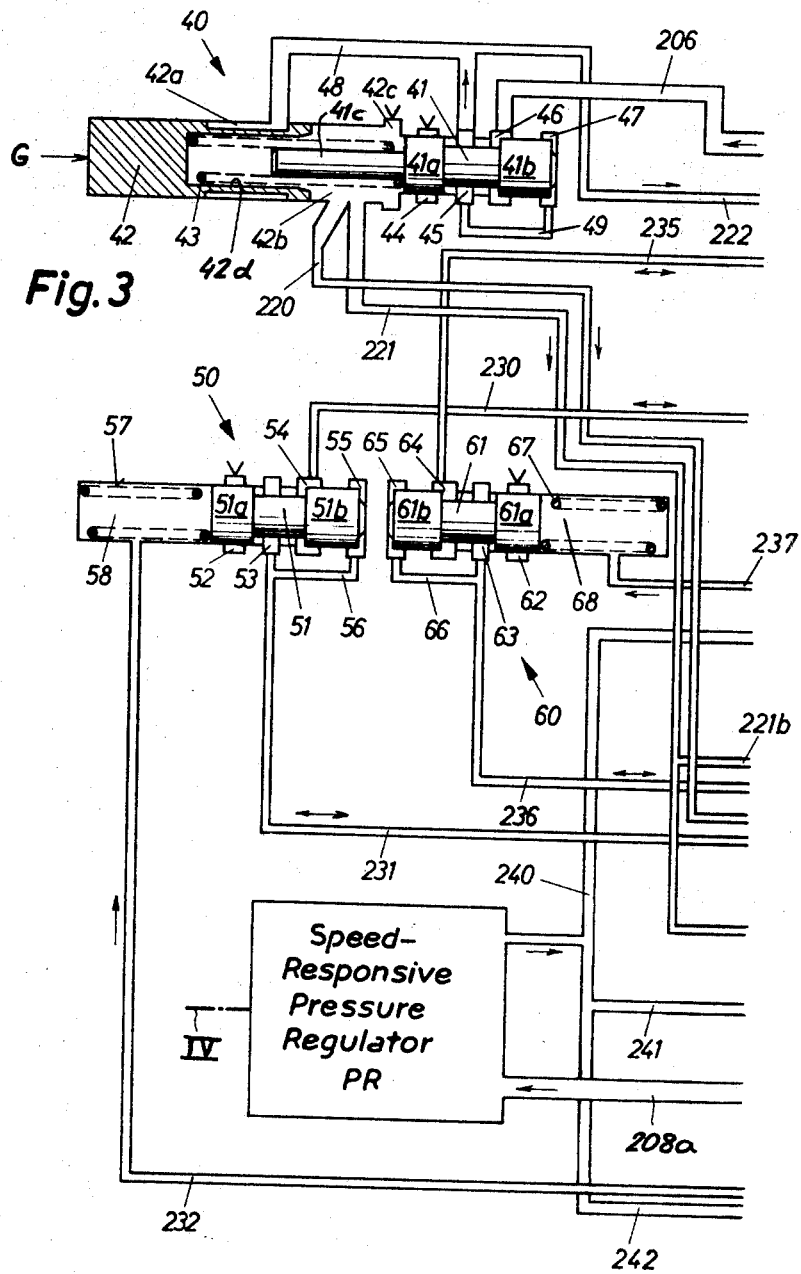
Figure 4:
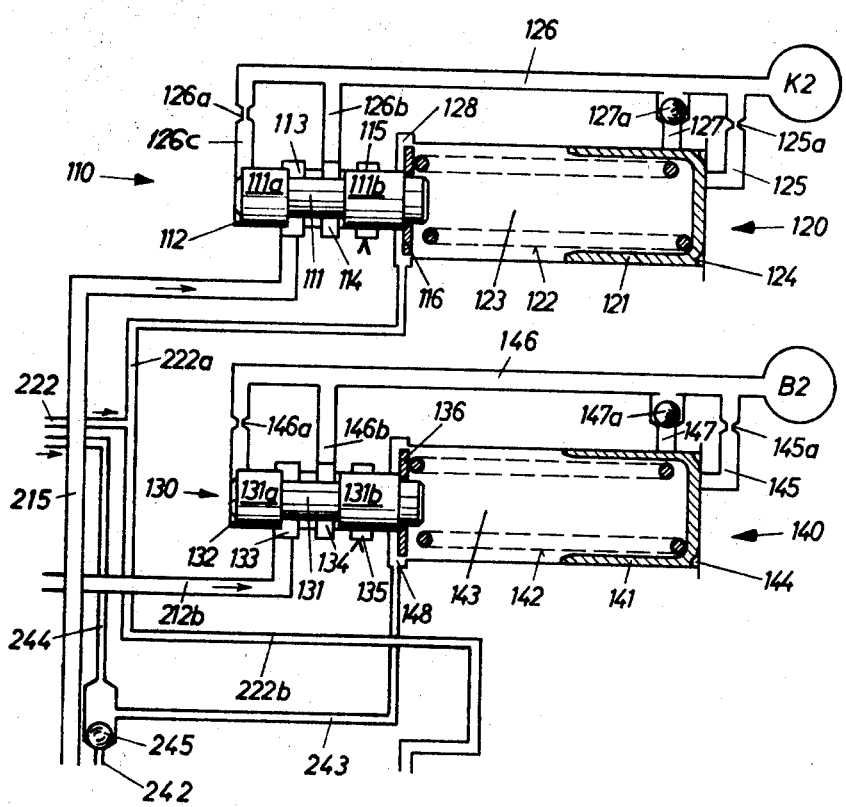
Figure 5:
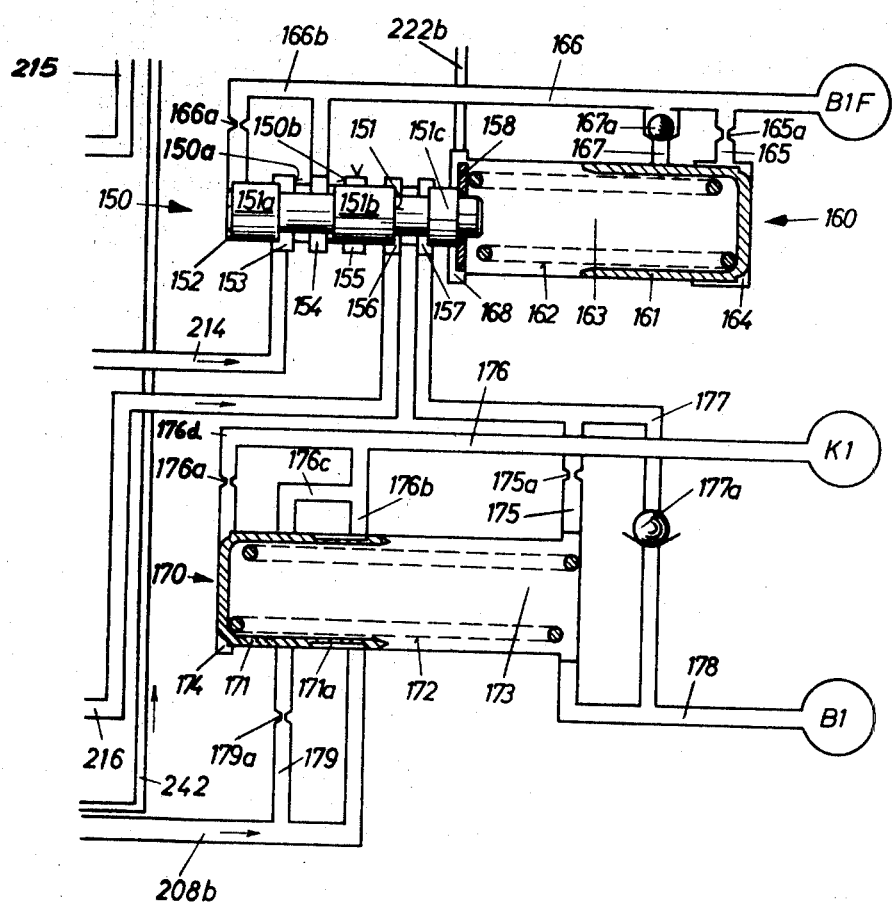

| | Fig. 1 | Fig. 4 |
|Fig. 3| Fig. 2 | Fig. 5 |

INVENTOR:
Hansjörg Dach
ATTORNEY:
Karl F. Ross

INVENTOR:
Hansjörg Dach
ATTORNEY:
Karl F. Ross

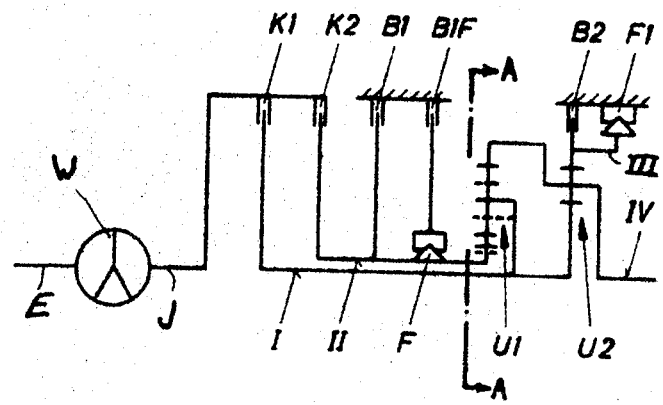
*Fig. 12*
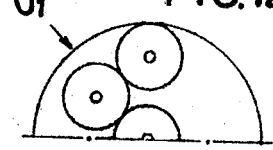
FIG. 12A
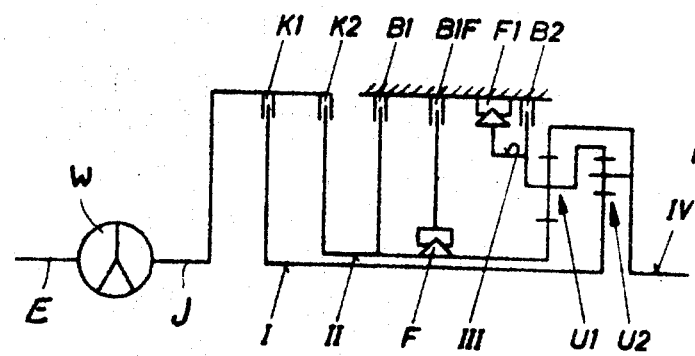
*Fig. 13*
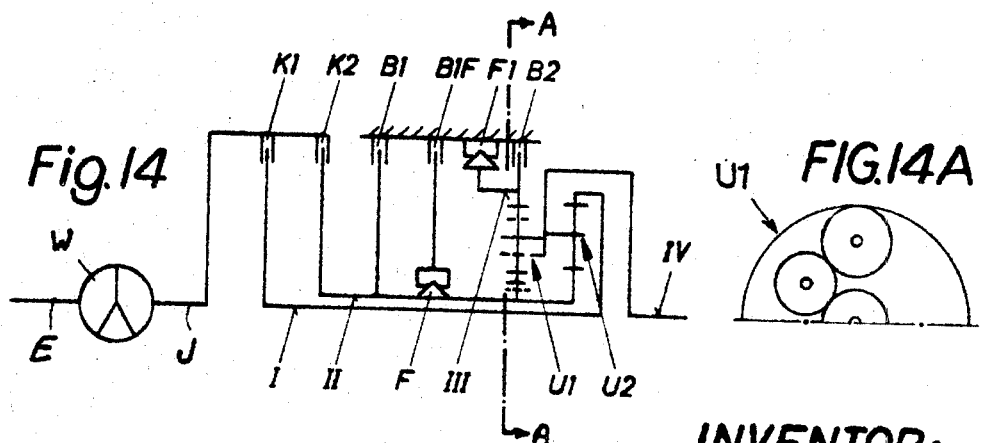
*Fig. 14*
FIG. 14A
JNVENTOR:
Hansjörg Dach
ATTORNEY:
Karl F. Ross

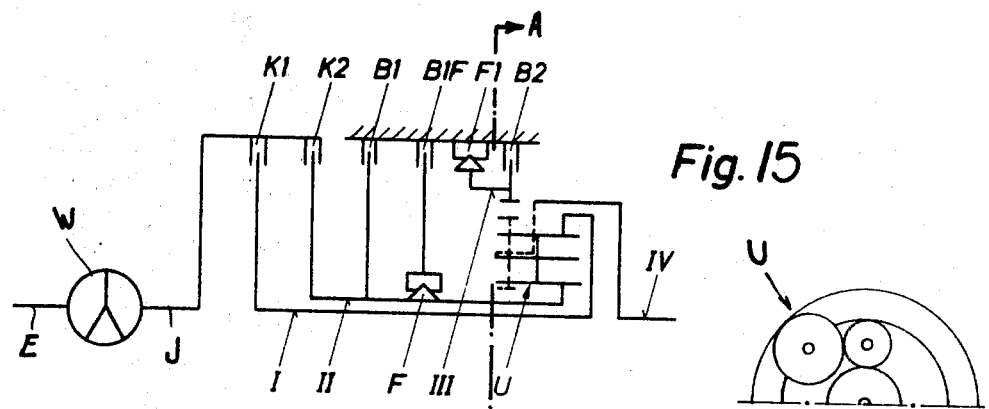
Fig. 15
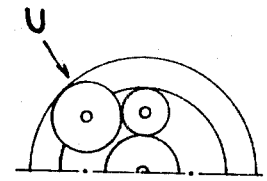
FIG. 15A
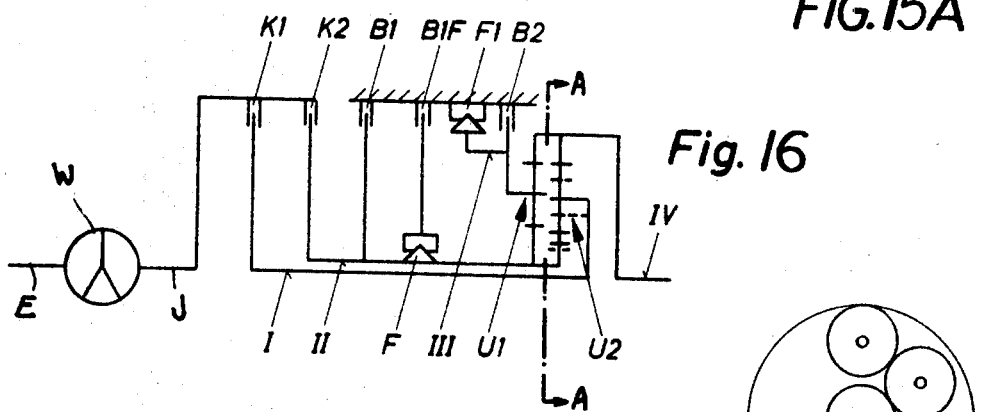
Fig. 16
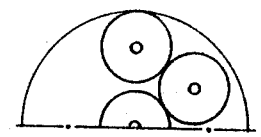
FIG. 16A
Fig. 17
| Gear | CLUTCHES | | BRAKES | | | FREEWHEEL |
|---|---|---|---|---|---|---|
| | K1 | K2 | B1 | B1F | B2 | F1 |
| 1 | + | − | − | − | + | + |
| 2 | + | − | + | + | − | − |
| 3 | + | + | − | + | − | − |
| R | − | + | − | − | + | − |
INVENTOR:
Hansjörg Dach
ATTORNEY:
Karl J. Ross

HYDRAULIC GEAR-SHIFT CONTROL FOR AUTOMOTIVE TRANSMISSION SYSTEMS

This application is a continuation-in-part of my copending application Ser. No. 817,984, filed 21 Apr. 1969, relating to a transmission system for automotive vehicles in which a change in speed ratio (commonly known as gear shift) is effected automatically under certain load and speed conditions.

It is customary in such a system to insert a hydrodynamic or other hydraulic torque converter in the power train between an input shaft, i.e. the shaft of a internal-combustion engine, and an output shaft driving the traction wheels of the vehicle, this torque converter lying in series with a set of gears which usually include at least one planetary-gear train and which can be selectively adjusted to provide different speed ratios between the two shafts (or between the driven shaft of the converter and the drive shaft powering the traction wheels). With a given engine load as determined by the position of an accelerator (gas pedal) controlling the fuel supply to the engine, the switchover from a lower speed ratio to a higher one occurs whenever the drive shaft and therefore the traction wheels surpass a certain speed level.

As already pointed out in my prior application referred to above, it is advantageous from the viewpoint of fuel economy that the vehicle be always driven at the highest speed ratio at which a desired velocity can be maintained. Thus, it is undesirable to shift back to a lower gear during a temporary loss of speed, as when the vehicle clears a small rise in the road, and it is equally inconvenient to have the transmission shift back and forth with minor changes in the accelerator position which may occur with the vehicle moving under conditions of low-to-moderate loading, e.g. when gradually accelerating from city traffic to highway driving.

To avoid these inconveniences, I have disclosed in my prior application a transmission system in which the switchover between two speed ratios (e.g. between "gear" and "third gear") is controlled by a spring-loaded valve piston having a first face subjected to a speed-dependent first fluid pressure which tends to displace the piston as soon as the fluid pressure reaches a predetermined level sufficient to overcome a predetermined biasing force acting in the opposite direction, i.e. in a sense tending to maintain the piston in a normal, low speed position. The displacement of the piston into its off-normal, high-speed position is also opposed by a second fluid pressure, acting upon a second piston face, which has a substantially constant value (preferably zero) whenever the accelerator is fully retracted (position of minimum load or idling) or partly advanced up to an intermediate position corresponding to a predetermined load threshold; when that threshold is exceeded, the second fluid pressure rises progressively with increasing load up to a position of maximum load, hereinafter referred to as full throttle. If the accelerator is provided with a kickdown position beyond full throttle, i.e. a position designed to supply extra power without significant increase in the fuel supply, the rise in second fluid pressure continues in the kickdown range in which, as is well known per se, the driver may experience an increased reaction force to apprise him of the fact that he is expending additional fuel.

In order to provide a desired hysteresis or toggle effect which under unchanged load conditions lets a downshift occur at a substantially lower speed than the upshift, the system disclosed in my prior application includes a split conduit with one branch terminating at the aforementioned second piston face and with another branch terminating at a third piston face, turned to the same side as the former, the first-mentioned branch being obstructed as soon as the piston shifts to its off-normal position. This hysteresis effect may supplement a similar effect created by two confronting piston faces of different surface areas, which are subject to fluid pressure in the off-normal piston position, the latter effect thus being also present when the load-dependent fluid pressure is cut off in the operating range below the load threshold described above.

Such cutoff may be effected by a plunger which acts through a compression spring upon a valve member of a throttle valve and, moving under the control of the accelerator, blocks the output of that throttle valve until the accelerator has reached its aforementioned intermediate position. In the kickdown position, another conduit unblocked by the plunger applies fluid pressure to the piston in a sense reducing the hysteresis effect due to the obstruction of one of the branches of the first conduit.

Certain of the aforementioned piston faces may be provided on an extension of the piston designed, for convenience of assembly, as an independent slider controlling the fluid supply to the gear-shifting means (friction clutches and/or brakes) of the planetary gear train, either directly or through a higher-order shift-control stage of similar construction.

An object of my present invention is to provide an improved transmission of the character described wherein the supply pressure of the system, from which the speed-dependent and load-dependent ancillary pressures are derived and which acts upon the hydraulically operable friction couplings (clutches and brakes), is itself variable with engine load so that shifting under greater load, occurring at higher speeds, is accomplished more rapidly than in the low-load range. A related object is to provide means for insuring a smooth transition from one speed ratio to another even during rapid shifting.

Another object of this invention is to provide means, advantageously under the control of the usual shift lever, for manually modifying the operation of the automatic switchover means to prevent upshifting to an intermediate ("second gear") or high ("third gear") speed ratio under conditions normally effecting such a shift.

In accordance with a feature of the present invention, a transmission system of the aforedescribed type includes a master valve disposed downstream of the engine-driven pump in the flow path of the hydraulic fluid supplied thereby, this master valve being responsive to the load-dependent output pressure of the above-mentioned throttle valve so as to vary the effective delivery pressure of the pump in a sense increasing that pressure with rising engine load. The same output pressure of the throttle valve can also be applied to a spring-loaded slider of one or more damped valves, interposed in the path of the operating fluid for certain hydraulic clutches and/or brakes, to supplement the spring force thereof with resulting retardation of the damping effect at higher load whereby these hydraulic devices fill up more rapidly to their operating pressure. With a damper designed to slow the buildup of operating pressure in the controlled device in an intermediate range of that pressure but to provide a low-resistance fluid path in the initial and terminal stages of activation, the total activation period can be held period can be held substantially constant —regardless of variations in supply pressure if load-dependent and therefore mutually proportional pressures are thus applied to opposite sides of the damping piston. In certain instances, however, it will be desirable to balance the load-dependent activating pressure by a speed-depending biasing pressure in order to suppress the damping action at high speeds for more rapid operation; this is particularly true of a brake intervening in the establishment of a low speed ratio ("first g") and serving, during downhill travel, to let the engine decelerate the vehicle. Since, in the system more fully described hereinafter, this brake also participates in the establishment of an inverted speed ratio when the manual selector is in its "reverse" position, another feature of my invention resides in the provision of a differential check valve admitting to the damper of this brake an overriding pressure equal or proportional to the supply pressure in lieu of the speed-dependent pressure when the system is in reverse, thereby balancing the supply pressure concurrently acting upon an opposite face of the slider during activation.

According to a further feature of my invention, a generator of a third fluid pressure blocking the upshifting to second and/or third gear is activable in certain restrictive positions of the manual selector. This generator advantageously consists of two stages, coacting respectively with the 1—2 shift valve and the 2—3 shift valve of the switchover assembly, each stage being normally biased to have a relatively low output pressure which, however, is increased by a supply of biasing fluid from the corresponding shift valve when the latter is in its downshifting position. Advantageously, two differential check valves discriminate between the output pressure of the throttle valve, referred to above as second fluid pressure, and the output pressure of the blocking generator, referred to as third fluid pressure, to apply only the larger one of these pressures to the pistons of the shift valves in a sense counteracting the upshifting force exerted by the speed-dependent first fluid pressure. In a nonrestrictive or "automatic" position of the speed selector, the conduits leading from the blocking-pressure generator to these differential check valves are vented to the low-pressure side of the hydraulic system.

Figure 6:
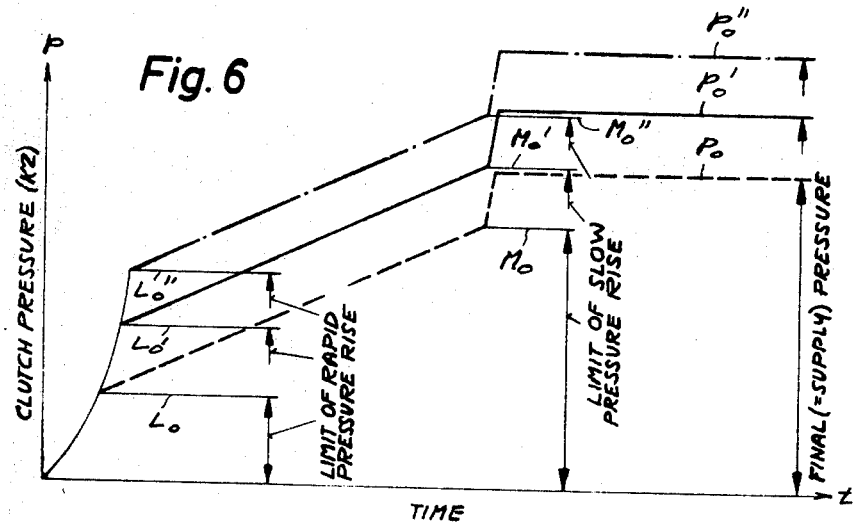
Figure 7:
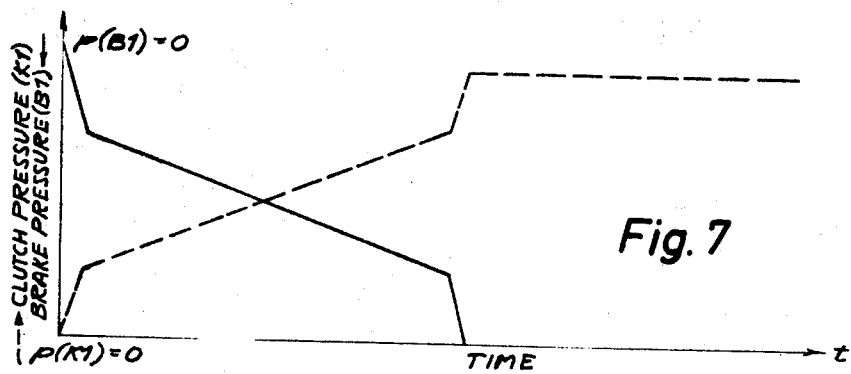
Figure 8:
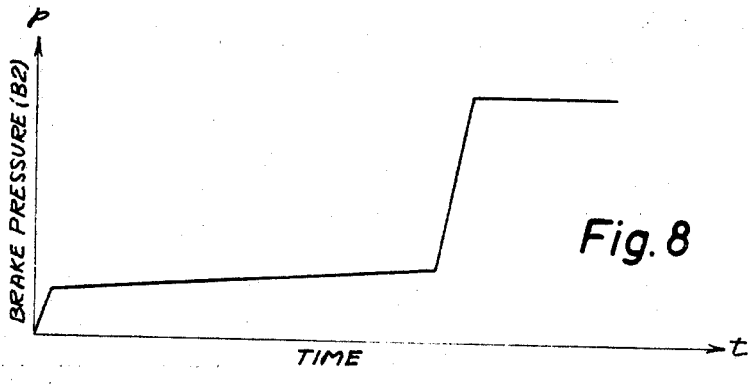
Figure 9:
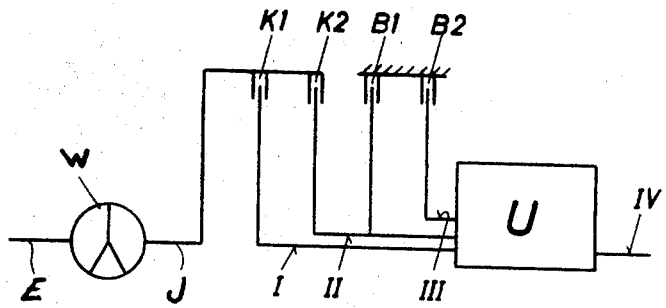
Figure 10:
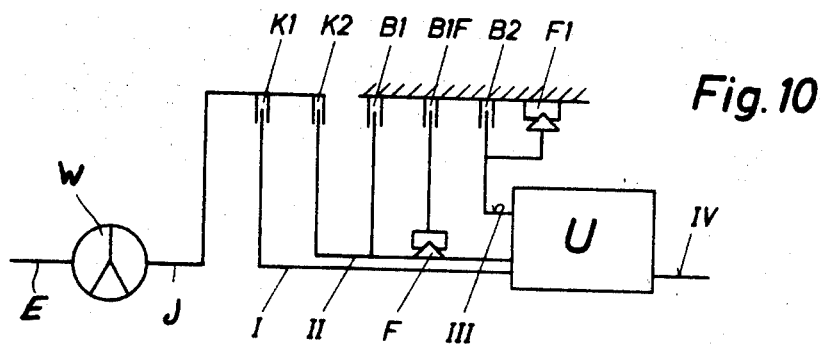
Figure 11:
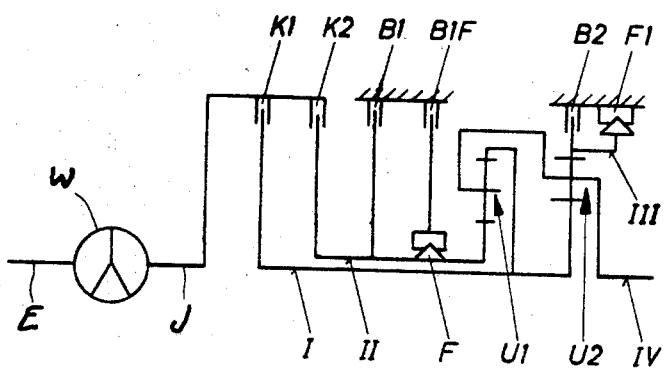

The above and other features of my invention will be fully described hereinafter with reference to the accompanying drawing in which:

FIGS. 1 through 5 show details of a hydraulic switching system for an automotive transmission according to the invention;

FIGS. 6—8 are graphs illustrating the operation of several hydraulic brakes and clutches included in the system of FIGS. 1—5;

FIG. 9 diagrammatically shows a basic transmission of the planetary-gear type controlled by the system of FIGS. 1—5;

FIG. 10 is a similar diagram showing a more elaborate transmission;

FIGS. 11—16 are specific embodiments of planetary-gear transmissions according to 10 usable in a system according to my invention, with FIGS. 12A, 14A, 15A and 16A representing axial views taken on the lines A-A of FIGS. 12, 14, 15 and 16, respectively;

FIG. 17 is a table showing the selective activation of the clutches and brakes of FIGS. 4 and 5 under different operating conditions; and FIG. 18 shows the manner in which FIGS. 1—5 are to be juxtaposed.

In FIGS. 1—5 the convention has been adopted of indicating by a V-like symbol the venting of a conduit to the sump or low-pressure side.

Reference will first be made to FIG. 9 which shows an engine shaft E coupled via a hydraulic converter W with a driven shaft J working into a planetary-gear set with two input shafts I, II, an intermediate shaft III and an output shaft IV which drives the traction wheel of the vehicle. Shaft J can be drivingly connected with either or both of the two input shafts I, II via respective hydraulic clutches K1, K2, shaft II being also immobilizable by a first hydraulic brake B1 whereas a second hydraulic brake B2 serves to arrest the shaft III.

In the more sophisticated arrangement of FIG. 10, two-way brake B1 is supplemented by a one-way brake B1F acting upon the shaft II through an overrunning clutch or freewheel F. A similar freewheel F1 is disposed between shaft III and the transmission housing in parallel with two-way brake B2. These freewheels serve, as is well known per se, to prevent forward entrainment of the respective shafts II, III with the engine driving but do not impede reverse rotation of these shafts when the torque is applied to the system by the output shaft IV, as when the vehicle is rolling downhill at a rate outrunning the effective engine speed.

The planetary-gear set U may take variety of forms, some of which are well known while others are the subject matter of five commonly owned German utility-model applications filed 6 Sept. 1968 under Nos. Z 12 078/47h to Z 12 082/47h. According to FIG. 11, the set U consists of two cascaded planetary-gear trains U1, U2, shaft I being rigid with the ring gear of the first train U1 and the sun gear of the second train U2 whereas shaft II is secured to the sun gear of the second train; the planet carriers of both trains are integral with output shaft IV whereas shaft III forms part of the ring gear of train U2.

In the system of FIGS. 12 and 12A, the first train U1 has two meshing planet gears (each representative of an array of such gears) on a common carrier rigid with shaft I which also is integral with the sun gear of train U2; the second planet carrier and the first ring carrier are integral with shaft IV whereas shaft II drives the first sun gear and shaft III again is part of the second ring gear.

In FIG. 13, the first and second sun gears are driven by shafts II and I, respectively, whereas shaft III interconnects the first planet carrier and the second ring gear while shaft IV is joined to the first ring gear.

In FIGS. 14 and 14A the first train U1 again has two meshing planetary gears whose carrier, rigid with the carrier of gear train U2, is positively coupled with shaft IV. The two sun gears are rigid with input shaft II whereas the first and second ring gears are integral with shafts III and I, respectively.

In FIGS. 15 and 15A the two trains of FIGS. 14 and 14A have been merged to a single set U with a common sun gear, driven by shaft II, and a single planet carrier, rigid with shaft IV, a first planet gear on that carrier meshing with the sun gear and with a ring gear driven by shaft I whereas a second, shorter planet gear meshes with the first planet gear and with another ring gear secured to shaft III.

According to FIGS. 16 and 16A, two gear trains U1, U2 are again provided, the two sun gears being integral with shaft II whereas the first planet carrier is rigid with shaft III and the second planet carrier (again having two meshing planetary gears) is secured to shaft I; the two ring gears are both integral with output shaft IV.

All the planetary-gear drives described above, as well as the conventional ones not illustrated, have a common mode of operation represented in the table of FIG. 17 where +indicates the operated condition and —indicates the idle condition of any frictional coupling element for three forward speed ratios or "gears" (1, 2, 3) and one reverse speed ratio (R). It will be seen that clutch K1 and brake B2 intervene in "first gear" in which the freewheel F1, if present, is also engaged as described above; clutch K1 and brake B1 are engaged in "second gear," together with brake B1F if freewheel F is provided. Only clutches K1 and K2 are necessary to establish the "third gear" mode of driving, yet in the system disclosed hereinbelow the brake B1F is also engaged to simplify the hydraulic circuit and to insure a more rapid engagement of brake B1 as described hereinafter. In reverse gear the clutch K2 and the brake B2 are active.

FIGS. 1—5, when juxtaposed in the manner illustrated in FIG. 18, depict the complete hydraulic system according to my invention designed to establish the different speed ratios in the manner represented in the table of FIG. 16.

The principal components of the system, shown in FIGS. 1—3, are a master valve 10, an ancillary valve 20, a manual speed selector 30, a throttle valve 40, a pair of stop valves 50 and 60, and two cascaded hydraulic shift valves 70 and 90. Valve 40 comprises a cylinder accommodating an axially slidable valve member 41, a similarly slidable plunger 42 and a compression spring 43 interposed therebetween, this spring being received in a recess 42d of plunger 42 and embracing a stem 41c of valve member 41. The valve member 41 is a piston with two axially spaced heads 41a, 41b urged by the spring 43 toward its illustrated limiting position adjacent the closed end of the bore 42b of the cylinder. Plunger 42, projecting from the open opposite end of the cylinder bore 42b, is operatively coupled (directly or through a servomotor) with the accelerator or gas pedal of an automotive vehicle, not further illustrated, as diagrammatically presented by an arrow G. Thus, the position of the accelerator determines that of the plunger 42 and, consequently, the pressure of spring 43 acting upon piston 41.

The reduced right-hand portion of the cylinder bore 42b, receiving the piston 41, is formed with several ring channels 44, 45, 46 and 47. Channel 44 is connected to a sump or the low-pressure side of a fluid-circulation pump P, driven by the vehicular engine, whose high-pressure side works via conduits 202, 205 and valve 10 into a conduit 206 terminating at channel 46. Valve 10 controls, in a manner more fully described hereinafter, the effective supply pressure in conduit 205; the output pressure of pump P in conduit 202 will generally vary somewhat with speed. Channels 45 and 47 are interconnected by an equalizing passage 49. A similar passage 48 extends from channel 45 to the widened left-hand portion of the cylinder bore 42b and opens into that bore at a location confronting an annular peripheral recess 42a of plunger 42. A further ring channel 42c, at the junction of the two different-diameter portions of bore 42b, is also connected to the sump.

Two channels 220 and 221 extend from closely adjoining, axially spaced locations of cylinder bore 42b to the cylinders of shift valves 70 and 90 as likewise described in greater detail below. The cylinder bore of valve 90 accommodates in its left-hand portion 93 a stepped piston 91 with two axially spaced heads 91a, 91b, of different diameters, and in its right-hand portion 106 a slider 98 with three heads 98a, 98b, 98c and a stem 98d as well as a compression spring 105 embracing the stem 98d while bearing upon the closed end of bore portion 106. Slider 98 effectively forms an extension of piston 91 with which it is held in continuous contact by the spring 105. The left-hand piston head 91a is larger than the right-hand piston head 91b which, in turn, exceeds the diameter of the two larger, identically dimensioned slider heads 98b and 98c; the third slider head 98a, immediately adjoining piston head 98b, is smaller than the other two slider heads.

The closed end of bore portion 93 is penetrated by a conduit 241 connected to a source of hydraulic fluid, shown as a pressure regulator PR, whose pressure is generally proportional to the speed of the output shaft of the controlled transmission system, i.e. the drive or cardan shaft IV of the vehicle. The pressure of this fluid tends to shift the piston 91 and the slider 98 from their normal left-hand position, shown in FIG. 2, to an off-normal right-hand position against the force of spring 105. Slider 98 acts as a valve member, its head 98b directing fluid from a supply conduit 213 to either of two outgoing conduits 215, 216. Conduits 213, originating at valve 70, opens into bore portion 106 at two axially spaced ring channels 101, 102. In the normal position of the slider, channel 102 communicates with a similar ring channel 103 connected to conduit 216, whereas in the off-normal position such a connection is established between channel 101 and another ring channel 100 connected to conduit 215. Two further ring channels 99 and 104 of bore portion 106 lead to the sump, channel 104 being normally blocked by head 98c whereas channel 99 is obstructed by head 98a in the alternate valve position only. The left-hand bore portion 93 also is formed with several ring channels, i.e. a channel 94a communicating through a differential check valve 220c with a branch 220b of conduit 220 and having a blind extension 94b connected thereto by a passage 94, a channel 96 communicating through a similar check valve 221a with conduit 221, and a channel 97 leading to the sump. In the normal piston position shown in FIG. 2, inlet 94a is unblocked by head 91a whereas inlet 96 is blocked by head 91b. Another branch line 220d terminates in a permanently open outlet at bore portion 106, 94a as well as to valve 220c which alternately connects it with branch 220b of conduit 220 or with a branch 231a of a conduit 231 extending from stop valve 50; branch 231a terminates at the second inlet of differential valve 221a. In the alternate position of valve 90, inlet 94a is blocked and inlet 96 is open.

With high-pressure fluid arriving over conduit 206, and with the gas pedal retracted so that plunger 42 assumes its extreme left-hand position as illustrated in FIG. 3, spring 43 exerts a relatively low pressure upon valve piston 41 which, in response to the fluid pressure from conduit 206 acting against the right-hand face of head 41a, is displaced toward the left so that head 41b throttles the influx of fluid into the space between the two piston heads while head 41a cracks open the outlet channel 44 until the pressure in that space balances that of the spring. This pressure is also communicated to connecting duct 48 whose outlet end, however, is obstructed at this point by the retracted plunger 42. Line 49 neutralizes or overcompensates the reverse fluid pressure acting upon the left-hand face of head 41b.

Under these circumstances, conduits 220 and 221 are vented to the sump via outlet 42c and the position of piston assembly 91, 98 depends on the magnitude of the fluid pressure from regulator PR at inlet 241 as compared with the countervailing pressure of biasing spring 105. This situation persists for any position of the accelerator-controlled plunger 42 between minimum engine load (gas pedal retracted) and a predetermined load threshold (gas pedal partly depressed). When the drive shaft speed is low, the bias of spring 105 prevails and supply conduit 213 remains connected to discharge conduit 216, the presence or absence of fluid pressure in these conduits depending on the position of the low-order switching stage represented by valve 70 as well as on the setting of selector 30.

The construction and mode of operation of the 1—2 shift valve 70 is similar to that of the 2—3 shift valve 90 described above. Thus, the cylinder bore of valve 70 accommodates in its left-hand portion 73 a stepped piston 71 with two axially spaced heads 71a, 71b, again of different diameters, and in its right-hand portion 84 a slider 76 with three heads 76a, 76b, 76c and a stem 76d as well as a compression spring 83 embracing the stem 76d while bearing 71a is again larger than head 71b which latter, in turn, exceeds the diameter of the two identical slider heads 76b and 76c; the third slider head 76a is smaller than the other two slider heads. The fluid space to the right of head 71b is vented at 75.

A conduit 240, also originating at pressure regulator PR, penetrates the closed end of bore portion 73 so that the regulator pressure tends to shift the piston 71 and the slider 76 from their illustrated normal position to an off-normal position against the force of spring 83. In the normal position, a conduit 209 coming from selector 30 and terminating at a ring channel 80 is connected with a ring channel 81 leading to an outgoing conduit 212; in the off-normal position, in which conduit 209 is cut off, conduit 212 is vented through a ring channel 82 while two other ring channels 78 and 79 are interconnected to extend a fluid line 208, also originating at selector 30, to the feeder 213 of valve 90 as well as to another 214, the lines 213, 214 being normally vented through a ring channel 77. Entry port 74 gives access to the space between the confronting differential piston faces of heads 71a and 71b, regardless of the position of the piston, this port being connected to a branch 221b of conduit 221 through a differential check valve 221c similar to the check valve 220c which connects the port 94a with branch 220b of conduit 220. A branch line 236a, entering the bore portion 84, alternately communicates through a differential check valve 220a with conduit 220 and with a line 236 extending from stop valve 60; a branch 236b of line 236 terminates at the second inlet of valve 221c.

The output of the engine-driven pump P, whose delivery pressure is subject to variation with engine speed, passes via a duct 202 through a ring channel 17 of master valve 10 whose cylinder has been partly illustrated at 10a. Ring channel 17 permanently communicates with the main supply conduit 205 from which the conduit 206 extends to throttle valve 40. Conduit 205 terminates in a ring channel 32 of selector 30 whose cylinder bore 31c accommodates heads 31a, 31b of an axially shiftable plunger 31; this plunger carriers a inter 31d cooperating with markings "R" (reverse), "N" (neutral), "A" (automatic), "2" (second gear) and "1" (first gear). The manual shift lever forming part of this selector may also have a conventional parking position not shown.

In the neutral position illustrated, selector 30 blocks the conduit 205 though conduit 206 still carries fluid to throttle valve 40 whose passage 48 has an extension 222 with a branch 22c leading to the bore 26 of master-valve cylinder 10a. This bore accommodates a first spring 27a, bearing upon a main piston 11 and an ancillary piston 20a in a sense tending to move them apart, and a second spring 27b, which acts in the same sense upon piston 11 only while resting against a shoulder of cylinder 10a. Piston 11 has three heads 13, 15 and 18 which, in the illustrated neutral position, separate the ring channel 17 from the other ring channels 16 and 19 and also isolate the ring channel 16 from another ring channel 14. Space 16 is connected by way of a low-pressure line 203 with the intake side of pump P which, through a duct 201, draws hydraulic fluid (oil) from a sump S. Space 14 connects with high-pressure duct 202 through a conduit 204 containing a constriction 204a. A supply channel 28 extends from space 19 to a feedback port 24 in the form of a similar ring channel in the region of piston 20a whose two heads 21 and 22 flank that ring channel in the illustrated limiting position of the piston. The latter forms part of a bleeder valve 20 which also includes an extension 28b of line 28, opening into cylinder 10a adjacent the right-hand face of head 22, and a vented ring channel 23 obstructed by head 21 in the illustrated position. Conduit 28 includes a constriction 28a beyond which a branch 28c leads to the torque converter W and, in parallel therewith, to a cooler C for overflowing and recirculated oil. The return to the low-pressure side of the system is obstructed by two spring-loaded valves $V_1$ and $V_2$.

Another line 207 extends from a ring channel 33 of selector cylinder 31c to a space 12 at the left-hand end of the valve cylinder 10a, this line containing a constriction 207a through which a reduced fluid pressure from conduit 205 is applied to the left-hand face of piston 11 whenever the plunger 31 is in any of its three forward positions "A," "2," "1." This pressure tends to shift the piston 11 to the right with consequent establishment of a leakage path between channels 16 and 17 where by some of the fluid issuing from pump P is drained off to sump S. At the same time, piston head 18 clears the path between channels 17 and 19 whereby some of the pump output can enter the conduit 28 to maintain the converter pressure at a suitable level. Whenever the pressure to the right constriction 28a rises sufficiently to drive the ancillary piston 20a to the left against the force of spring 27a, a leakage path is established between channels 23 and 24 to reduce that pressure. On forward drive, therefore, the fluid pressure in conduits 205 and 28 assumes a value proportional to the combined biasing force acting upon piston 11, i.e. the force of springs 27a and 27b as well as the fluid pressure from throttle valve 40 superimposed thereupon via lines 222 and 222c; since the latter pressure is dependent on load, i.e. on the position of the accelerator-controlled plunger 42 and the resulting stress of spring 43, the effective supply pressure developed in the output 205 of master valve 10 with also vary with load.

In the reverse position "R" of selector 30, however, conduit 207 is vented to the sump at 37 while conduit 205 communicates with two lines 210, 211a via a ring channel 36 which is vented to the sump in all other selector positions. In this case, therefore, the selector 30 transmits the full output pressure of pump P regardless of load.

In addition to ring channel 33, which interconnects the conduits 207 and 208, plunger 31 also unblocks two further ring channels 34 and 35 upon advancing past its nonrestrictive position "A" into its restrictive positions "2" and "1," respectively, Channel 34 opens into a conduit 209 which is vented to the sump at 39 in all selector positions to the left of position "2;" an extension 230 connects conduit 209 with stop valve 50. Channel 35 similarly opens into a conduit 235 which is vented to the sump at 38 in all selector positions to the left of position "1" and which terminates at the stop valve 60. Two further fluid lines terminating at stop valves 50 and 60 are branch 232 of conduit 216 and a branch 237 of conduit 212. A differential check valve 212a is inserted between conduit 212 and an extension 211c of conduit 211a, this valve having an outlet duct 212b.

The two stop valves 50 and 60 are of identical construction and comprise pistons 51 and 61, each with two axially spaced heads 51a, 51b and 61a, 61b, in cylinders whose bores 58, 68 accommodate respective compression springs 57, 67 tending to maintain the associated pistons in their illustrated normal positions. Piston 51, in its normal position, interconnects a pair of ring channels 53 and 54 into which the lines 231 and 230 open; line 231 has an extension 56 leading to a ring channel 55 at the outer face of piston head 51b whereby pressure in line 231 tends to establish a piston position in which lead 51b partly obstructs the flow between channels 54 and 53 to a vented ring channel 52. Similarly, valve 60 has a pair of ring channels 63 and 64 respectively communicating with lines 236 and 235 which are interconnected in the normal piston position illustrated, an extension 66 of line 236 leading to a ring channel 65 at the outer face of piston head 61b to drive the piston 61 inwardly against the force of its spring 68; a vented channel 62 drains off some of the high-pressure fluid in the displaced position of the piston. Thus, the two pressure-generator stages 50 and 60 act as pressure-reducing valves similar to throttle valve 40, their output pressures depending on the stress of their loading springs 57,67 aided by the load-dependent fluid pressure admitted to spring chambers 58 and 68 via conduits 232 and 237 whenever conduits 216 and 212 carry fluid.

With selector 30 in its automatic position "A," and with valve 70 in its upshift position so that fluid at the output pressure of valve 10 reaches the conduit 213, the operation of valve 90 will be as follows:

Whenever, within the low-load range of throttle positions, the speed of drive shaft IV reaches a predetermined level, the fluid pressure acting upon piston head 91a overrides the pressure of spring 105 so that the device 90 shifts to its alternate position. At this point the supply pressure from conduit 213, apart from being transmitted to conduit 215 in lieu of conduit 216 (which is concurrently vented via outlet 104), also acts upon the confronting faces of slider heads 98a and 98b which, in view of the larger effective surface area of head 98b, creates a differential pressure tending to hold the slider 98 in its right-hand position. This creates a hysteresis effect which maintains the transmission in its third-gear condition until the drive shaft has dropped to another predetermined level, lower than the previous one, at which the spring pressure overcomes the combined fluid pressures from inlets 241 and 213 to restore the normal position of FIG. 2 wherein conduit 213 again communicates with conduit 216 while conduit 215 is vented to the sump via outlet 99.

If, with the device 90 in its normal position, the gas pedal is depressed sufficiently to advance the plunger 42 beyond an intermediate position corresponding to a selected load threshold, the fluid pressure prevailing in line 48 is transmitted to conduit 220 and thence via valve 220a to inlet 94a so as to reinforce the pressure of spring 105, thereby raising the switchover speed at which upshifting can occur. The pressure in conduit 220 is determined by the degree of compression of spring 43 and, therefore, varies with the position of the accelerator-controlled plunger 42. The establishment of full communication between lines 48 and 220 occurs very rapidly, with the plunger 42 moving only slightly beyond its threshold position to establish a higher switchover speed which must be reached before the piston 91 and the slider 98 can be shifted to the off-normal position.

With progressively greater depression of the gas pedal, up to a "full throttle" position corresponding to maximum load, the pressure of spring 43 and therefore the fluid pressure in line 48 progressively increases so that the switchover speed rises linearly. The shifting of piston 91, however, cuts off the influx of fluid from branch 220a so that, in the alternate position, only the fluid pressure applied through branch 220d to slider head 98c is effective to supplement the force of spring 105 in opposing the speed-dependent fluid pressure from inlet 241. This creates another hysteresis effect which, added to the one discussed in connection with the confronting faces of heads 98b and 98c, retards the downshift to a speed range which is still higher than the upper limit of the low-load range but is considerably below the upshift range established by the pressurization of line 220. When the accelerator position again approaches the load threshold, the blocking of conduit 220 by plunger 42 shifts the switchover point for the lower speed ratio back to its original lower level.

The switchover during upshifting and downshifting occurs at still higher speeds in a fully depressed position of the gas pedal, known as the kickdown position, in which the plunger 42 is advanced sufficiently to unblock not only the conduit 220 but also the conduit 221. Until the piston 91 and slider 98 shift off normal, conduit 221 is obstructed by piston head 91b so that the only effect of the added depression of the gas pedal is the further increase in the fluid pressure of conduit 220; fuel supply to the engine, already at its maximum, is not materially affected by this operation.

As the piston 91 eventually moves toward the right (upshift), its head 91b sufficiently unblocks the channel 96 communicating with conduit 221 to let the fluid pressure in that conduit act differentially upon the two confronting faces of heads 91a, 91b in a sense reinforcing the bias of spring 105, thereby partly canceling the aforedescribed combined hysteresis effect so that the gap between the upshifting and downshifting speed levels is narrowed though remaining still somewhat greater than the gap between these speed levels at low load. The kick down effect, or return to lower speed ratio at full throttle, occurs therefore at higher drive shaft speeds than in the normal high-load range.

In a similar manner, pressure in line 220 loads the spring chamber 84 of valve 70 whereas pressure in line 221 acts differentially upon piston heads 71a and 71b, both these pressures tending to restore the 1—2 valve 70 to normal. If valve 90 is still in its off-normal position, such a shift of valve 70 vents the conduit 215 via conduit 213 and ring channel 77.

With the selector 30 in its restrictive position "2," a switchover to third gear is impeded by the transmission of fluid to intermediate-speed stage 50 via channel 34 and line 230, the resulting blocking pressure developed in line 231 overriding the fluid pressure, if any, present in lines 220 and 221 to act upon the piston 91 in space 94 and upon the slider 98 in space 106 so as to tend to lock this piston and slider in the illustrated left-hand position in which only the low and intermediate speed ratios can be established. If piston 71 and slider 76 of valve 70 are at this time in their right-hand position, pump pressure as modified by master valve 10 acts through conduit 232 upon piston 51 to intensify the output pressure of valve 50, particularly at high load. This condition persists if selector 30 is advanced into its other restrictive position "1" in which the shift to second gear is also impeded by the transmission of fluid pressure to low speed stage 60 via ring channel 35 and conduit 235; the resulting fluid pressure in conduit 236 overrides the fluid pressure, if any, applied via conduits 220 and 221 to the spring chamber 84 and the ring channel 74, respectively, thereby tending to immobilize the piston 71 and slider 76 in their left-hand position even at relatively high speed and low load. In this position, fluid at supply pressure reaches the spring chamber 68 of valve 60 via conduits 209, 212, 237 to intensify the output pressure of that valve, again particularly at high load. Upon the removal of selector plunger 31 to any other position, the pressure generated by valves 50 and 60 is instantly relieved.

The fluid discharged at speed-dependent pressure by regulator PR, which may include a centrifugal governor driven by shaft IV, is distributed over the aforementioned conduits 240 and 241 as well as a third conduit 242 in parallel therewith. The intake of regulator PR is connected 222, a conduit 208a branched off the line 208 and bypassing the shift valves 70 and 90, this conduit having an extension 208b. Conduits 222, 212b, 214, 215, 216, 208b and 242, together with an extension 244 of conduit 211a, lead to the clutch and brake activators shown in FIGS. 4 and 5 whose construction and operation will now be described.

Clutch K1, which according to the table of FIG. 17 is actuated in all three forward speeds, receives its operating fluid from the bypass line 208b by way of a damper 170 which comprises a piston 171 slidable in a cylinder bore 173 against the pressure of a loading spring 172. The outer periphery of piston 171 has a groove 171a which, in the illustrated home position of the piston, connects the line 208b with a line 176 leading to the feeder line 176 of clutch K1. A branch 176d of this feeder line, containing a constriction 176l, terminates at a space 174 adjacent the left-hand face of piston 171 so that, upon incipient pressure buildup in clutch K1, the piston is urged toward the right with progressive compression of spring 172. The initial displacement of that piston blocks the connection between conduit 208b and 176b, but not before another fluid path has opened up between a branch 179 of conduit 208b, containing a constriction 179a, and a branch 176c of conduit 176b. The clutch pressure thereupon increases more slowly until its magnitude suffices to drive the piston 171 far enough to the right to reestablish the low-resistance path 208b-176b; at this point the final rise in activating pressure proceeds rapidly until this pressure equals the supply pressure in conduit 205. The broken line in FIG. 7 illustrates the activation of clutch K1.

Spring chamber 173 of damper 170 is also traversed by a fluid line 175, containing a constriction 175a, which connects with the feeder 178 of brake B1 and is bypassed by another line 177 containing a check valve 177a for rapid drainage. Lines 175 and 177 normally communicate with line 216 by way of two ring channels 156, 157 in a cylinder bore of a control valve 150 for one-way brake B1F, this control valve having a slider 151 urged into its illustrated home position by a damper 160 which includes a piston 161 in a chamber 136 housing a spring 162. Reference is made to my copending application Ser. No. 785,687 filed 20 Dec. 1968, showing a damper construction of this type for the control of two loads B1, B1F.

Slider 151 has three heads 151a, 151b, 151c which normally interconnect, in addition to ring channels 156 and 157, two further ring channels 153 and !154 respectively communicating with high-pressure line 214 and with a line 166 feeding the brake B1F. The branch 166b of the latter line, containing a constriction 166a, terminates at a space 152 adjacent the left-hand face of slider head 151a. A further ring channel 155, normally blocked by head 151b, leads to the sump and serves to drain off excess fluid from channel 154 when the slider 151 is displaced toward the right, during the buildup of activating pressure, against the force of loading spring 162 which bears upon a disc 158 rigid with the slider. The other end of spring 162 is engaged by a piston 161 whose outer face confronts a space 164 communicating with line 166 via a branch 165 containing a constriction 165a. Cylinder bore 163 is also connected to line 166 via a venting channel 167 containing a check valve 167a.

With high pressure applied to conduit 214, brake B1F fills up rapidly during an initial stage until the feedback pressure in space 152 begins to displace the slider 151 to the right, with resultant partial obstruction of the supply paths 214 and 166 and establishment of a leakage path between channels 154 and 155. Valve 150 thus operates essentially in the manner of pressure-reducing valves 40, 50 and 60, the reduced output pressure of that valve causing a gradual buildup of activating pressure in line 166 until that pressure is sufficient to overcome the loading force of spring 162 acting upon piston 161. At this moment the piston is rapidly driven to the left and, on reaching the disc 158, restores the slider 151 to its home position in which the full supply pressure is communicated to line 166.

It will be noted that the activation of brake B1 is interrupted as long as slider 151 of valve 150 is in its aforedescribed off-normal position. Upon a switchover from first to second gear, therefore, brake B1F is engaged before brake B1 which insures a smoother upshifting in the event that the transmission is driven by the vehicle rather than by the engine. Since line 214 bypasses shift valves 90, the operation of brake B1F is independent of the position of that valve so that this brake remains actuated also in third gear (see FIG. 17). The downshifting of second gear, therefore, does not involve any delay in the activation of two-way brake B1. The filling rate of brake B1, however, is modified by the damper 170 whose piston 171 is in its right-hand position when clutch K1 is engaged. Thus, the activating pressure of brake B1 developed in conduit 175 tends to repress that piston against its biasing force furnished by the activating pressure of clutch K1 which in turn is opposed by the force of spring 172. With the final pressures in feeder lines 176 and 178 about equal, spring 172 holds this piston in its illustrated home position when both the clutch K1 and the brake B1 are fully activated. The resulting rate of energization of brake B1 has been illustrated in full lines in FIG. 7.

Spring chamber 163 of damper 160 is also connected via a ring channel 168 to an extension 222b of conduit 222 carrying the output pressure of throttle valve 40 whereby the biasing force acting upon its slider 151 and piston 161 will vary with load. This is also true of a generally similar damper 120, associated with a control valve 110 for clutch K2, whose spring chamber 123 is connected via its ring channel 128 to another branch 222b of conduit 222. The slider 111 of valve 110 differs from slider 151 only by the absence of a third head, its two heads 111a and 111b normally establishing communication between spaces 113 and 114 respectively communicating with conduit 215 and with a line 126b leading to the feeder 126 of clutch K2. A branch 126c of that feeder, containing a constriction 126a, leads to a space 112 adjacent the left-hand face of slider head 11a to apply to it the activating pressure of clutch K2 in a sense tending to move slider 111 toward the right against the force of its loading spring 122 which bears upon its disc 115 and a piston 121. In its off-normal position the slider head 111b establishes a leakage path from ring channel 114 to a vented channel 115. Another branch 125 of conduit 126, containing a constriction 126a, extends to a space 124 adjacent the right-hand end of piston 121; the cylinder bore receiving this piston communicates, via a further branch 127 containing a check valve 127a, with line 126 for a rapid draining of that space when the pressure in conduit 215 is relieved.

The activation of clutch K2 by valve 110 and damper 120, which is basically the same as the activation of brake B1F by valve 150 and damper 160, has been illustrated in FIG. 6 for three different levels of the supply pressure $p_0$, $p_0'$ and $p_0''$. With a relatively low pressure $p_0$, rapid filling stops at a level $L_0$ since the biasing force acting upon slider 111 is also relatively low. The activating pressure then rises gradually to another level $M_0$ at which point the piston 121 is repressed to restore the slider 111 to its home position by engaging the disc 116 with ensuring rapid rise of the clutch pressure to the supply level $p_0$. The corresponding levels for supply pressures $p_0'$ and $p_0''$ have been indicated at $L_0'$, $L_0''$ and $M_0'$, $M_0''$. It will be noted that the overall activation period is substantially constant regardless of the supply pressure.

Brake B2 is operated by means of a similar control valve 130 and associated damper 140, corresponding elements having been designated by analogous reference numerals differing from the foregoing ones only by the replacement of a "1" or a "2" in the position of the tens digit with a "3" or a "4," respectively. Ring channel 148 of cylinder bore 143, however, does not receive the load-dependent pressure from throttle valve 40 but is connected to a line 243 which communicates through a differential check valve 245 with either line 242 or line 244, depending on the absence or presence of supply pressure from conduit 211a in line 244.

Since conduit 211a is vented in all positions except the reverse position R of selector 30, line 243 receives the speed-dependent output pressure of regulator PR at all forward speeds whereby the initial pressure buildup in brake B2 is relatively small at low speeds and relatively large at high speeds. This buildup has been illustrated in the graph of FIG. 8. On backing, the overriding supply pressure entering the chamber 143 lines 211a, 244 and 243 varies proportionately with the activating pressure applied to ring channel 133 via lines 211a, 211c and 212b, conduit 212 being then blocked by the check valve 212a. The venting of conduit 215 in the normal position of valve 90 takes place by way of conduit 210 and space 36.

In connection with the damped valves shown in FIG. 4, reference may also be made to commonly owned application Ser. No. 766,679 filed by me jointly with Konrad Sterk and Winfried Felder on 11 Oct. 1968.

The loading springs of the various valves may be made adjustable for the selection of a proper biasing pressure.

I claim:

1. In an automotive transmission system connected between a fuel-powered engine and an output shaft, including gear-shifting means for switching between a relatively low ratio and a relatively high ratio of output-shaft speed to engine speed and further including an operator-controlled accelerator for varying the fuel supply to said engine, the combination therewith of a source of first fluid pressure varying generally proportionally to said output-shaft speed; fluid-supply means coupled with said accelerator for generating a second fluid pressure which remains substantially invariable between a retracted accelerator position corresponding to minimum engine load and an intermediate engine position corresponding to a predetermined load threshold, said second fluid pressure thereupon rising progressively with further advances of said accelerator beyond said intermediate position; a manual speed selector with a nonrestrictive operating position and a restrictive operating position; automatic switchover means for said gear-shifting means comprising piston means subjected to said first fluid pressure and countervailingly subjected to said second fluid pressure in said nonrestrictive operating position of said selector, said switchover means further including biasing means opposed by said first fluid pressure and aided by said second fluid pressure tending to hold said piston means in a normal position which said gear-shifting means maintains said relatively low ratio, said first fluid pressure tending to move said piston means into an off-normal position in which said gear-shifting means maintains said relatively high ratio whereby upshifting occurs at a substantially invariable output-shaft speed with loads below said threshold and at progressively higher speeds with loads increasing beyond said threshold; a generator of third fluid pressure effective in said restrictive operating position of said selector to develop a force overriding said first fluid pressure for preventing upshifting at said substantially invariable speed regardless of load; and pump means for delivering high-pressure hydraulic fluid to said gear-shifting means under the control of said piston means.

2. The combination defined in claim 1 wherein said switchover means comprises a first valve and a second valve in cascade with said first valve, said piston means including a first piston in said first valve and a second piston in said second valve, said biasing means including a spring for each valve in a cylinder chamber accommodating the respective piston and inlet means to said chamber communicating with said fluid-supply means for applying said second fluid pressure to the piston, said first piston having a first and a second position for switching between a low speed ratio and an intermediate speed ratio, said second piston having a first and a second position for switching between said intermediate speed ratio and a high speed ratio in the second position of said first piston.

3. The combination defined in claim 2 wherein said second valve is provided with a further inlet communicating with said fluid-supply means for applying said second fluid pressure to said second piston in aiding relationship with the fluid pressure in the corresponding cylinder chamber, said second piston in its second position blocking said further inlet with a resulting hysteresis effect retarding the return of said second piston to its first position, said further inlet being also connected to an outlet of said generator for receiving therefrom said third fluid pressure in said restrictive operating position of said selector.

4. The combination defined in claim 3 wherein said second valve is provided with differential valve means for exclusively admitting the larger one of said second and third fluid pressures to said further inlet.

5. The combination defined in claim 3 wherein said fluid-supply means comprises a throttle valve with an inlet port for high-pressure fluid, a first outlet port connected to said inlet means of the cylinder chambers of said first and second valves, and a second outlet port connected to said first valve at a first entry port for applying fluid thereto in a sense urging said first piston into its first position, said second outlet port being also connected to said second valve at a second entry port blocked by said second piston in its first position but unblocked in its second position for applying fluid thereto in a sense urging said second piston into its first position, thereby partly canceling said hysteresis effect, said throttle valve having a plunger operatively coupled with said accelerator and biased into a retracted position in which said first and second outlet ports are blocked, said plunger also having a high-load position unblocking said first outlet port and a kickdown position unblocking both said outlet ports, said generator being provided with first and second conduits respectively terminating at said first and second entry ports for delivering said third fluid pressure to said first and second valves in said restrictive operating position of said selector.

6. The combination defined in claim 5 wherein said generator comprises a low speed stage and an intermediate speed stage respectively feeding said conduits, both said stages being effective in said restrictive operating position of said selector, the latter also having an alternate operating position activating only said intermediate speed stage.

7. The combination defined in claim 6 wherein said stages are provided with respective valve cylinders including spring means for establishing a predetermined minimum pressure level in the outputs of said stages, further comprising a first connection extending from said first valve to the valve cylinder of said low speed stage for subjecting same to the delivery pressure of said pump means in the first position of said first piston, in a sense augmenting the pressure level of said low speed stage, and a second connection extending from said second valve to the valve cylinder of said intermediate speed stage for subjecting same to the delivery pressure of said pump means in the first position of said second piston with said first piston occupying said second position, in a sense augmenting the pressure level of the latter stage.

8. The combination defined in claim 5 wherein said first and second valves are provided with differential valve means for exclusively admitting the larger one of said second and third fluid pressures to said first and second entry ports.

9. The combination defined in claim 2, further comprising conduit means extending from said generator to said inlet means for delivering said third fluid pressure to the chambers of said first and second valves in said restrictive operating position of said selector.

10. The combination defined in claim 9 wherein said first and second valves are provided with differential valve means for exclusively admitting the larger one of said second and third fluid pressures to said inlet means.

11. The combination defined in claim 1 wherein said gear-shifing means includes planetary-gear means and hydraulically operable frictional coupling means therefor, further comprising a main valve in the path of said hydraulic fluid responsive to the output of said fluid-supply means for increasing the supply pressure of said pump means with increasing load under the control of said accelerator means, said selector including flow-control means inserted in said path in series with said main valve.

12. In an automotive transmission system connected between a fuel-powered engine and an output shaft, including operator-controlled accelerator means for varying the fuel supply to said engine, a hydraulic torque converter, and mechanism in series with said converter for switching between a relatively low ratio and a relatively high ratio of output-shaft speed to engine speed in response to different operating conditions, the combination therewith of pump means driven by said engine for delivering a high-pressure hydraulic fluid to operate said converter and said mechanism, and valve means in the flow path of said hydraulic fluid for increasing the supply pressure of said pump means with increasing load under the control of said accelerator means; said valve means comprising a cylinder with an inlet connected to said pump means for receiving said fluid therefrom, a main outlet connected to said mechanism and an overflow outlet connected to said converter, piston means in said cylinder for controlling the distribution of fluid from said inlet to said outlets, spring means in a compartment of said cylinder urging said piston means into a normal position connecting said inlet with said main outlet to the substantial exclusion of said overflow outlet, first conduit means extending from said main outlet to said cylinder for applying thereto a fluid pressure conteracting the force of said spring means and urging said piston means into an off-normal position wherein said inlet communicates with said overflow outlet, recirculation means effective in said off-normal position for returning a portion said flow path and said compartment for developing in said compartment a biasing pressure supplementing the force of said spring means, and a throttle valve included in said second conduit means and operatively connected with said accelerator means for increasing said biasing pressure and consequently the pressure level at said outlets with increasing load; said piston means comprising a main piston and an ancillary piston on opposite sides of said compartment, said spring means and biasing pressure tending to move said pistons apart, said overflow outlet forming a channel with a constriction ahead of said converter, said inlet and said outlets being provided on a section of said cylinder controlled by said main piston, said cylinder being further provided with a feedback port and with a venting port on a section thereof controlled by said ancillary piston, the latter disconnecting said feedback port from said venting port in a normal position remote from said main piston, said channel having a branch extending therefrom beyond said constriction to said feedback port, said branch being provided with an extension terminating at said cylinder near a face of said ancillary piston for urging the latter toward said main piston into an off-normal position in which said feedback port communicates with said venting port to relieve the fluid pressure applied to said converter.

13. The combination defined in claim 12 further comprising a manual speed selector with a neutral position, a reverse position and at least one forward position, and flow-control means coupled with said speed selector and interposed in the flow path between said main outlet and said mechanism, said first conduit means being blocked by said flow-control means in said neutral and reverse positions of said selector but being unblocked in any forward position thereof, said second conduit means being branched off the flow path between said main outlet and said selector.

14. The combination defined in claim 12 wherein said spring means comprises a first spring bearing on both pistons and a second spring bearing only upon said main piston.

15. In an automotive transmission system connected between a fuel-powered engine and an output shaft, including planetary-gear means provided with hydraulically operable frictional coupling means and automatic switchover means for operating said frictional coupling means to select different ratios of output-shaft speed to engine speed in response to different operating conditions, the combination therewith of pump means driven by said engine for delivering a high-pressure hydraulic fluid to said frictional coupling means by way of said switchover means, operator-controlled accelerator means for varying the fuel supply to said engine, damped valve means in the flow path of said hydraulic fluid provided with spring-loaded slider means controlling the fluid flow to at least part of said coupling means, a throttle valve operatively connected with said accelerator means and communicating with said pump means for developing a variable fluid pressure increasing with engine load, and conduit means extending from said throttle valve to said damped valve means for superimposing said variable fluid pressure upon the spring force acting on said slider means.

16. The combination defined in claim 15 wherein said frictional coupling means includes a one-way brake and a two-way brake intervening in the establishment of an intermediate speed ratio by said planetary-gear means, said slider means being responsive to the operating pressure of said one-way brake to assume an off-normal position during buildup of said operating pressure, said pump means communicating with said two-way brake via a connection cut off by said slider means in said off-normal position.

17. The combination defined in claim 16 wherein said frictional coupling means additionally includes a clutch connected to said pump means via a fluid line independent of said slider means and of said automatic switchover means, further comprising a manual speed selector with a neutral position, a reverse position and at least one forward position, flow-control means coupled with said speed selector and interposed in the flow path between said pump means and said switchover means, said flow-control means blocking said line in said neutral and reverse positions but unblocking same in any forward position of said selector, and resilient damping means common to said line and said connection for balancing the operating pressures of said clutch and said two-way brake against each other while controlling the buildup of either of said operating pressures.

18. The combination defined in claim 17 wherein said frictional coupling means additionally includes a second two-way brake intervening in the establishment of a low speed ratio by said planetary-gear means, said second brake being connected to said switchover means via a channel including second damped valve means provided with second spring-loaded slider means controlling the fluid flow thereto independently of said variable fluid pressure, further comprising a source of speed-dependent fluid pressure and second conduit means extending from said source to said second damped valve means for superimposing said speed-dependent pressure upon the spring force acting on said second slider means.

19. The combination defined in claim 18 wherein said frictional coupling means includes a second clutch intervening jointly with said second brake in the establishment of an inverted speed ratio, said second brake and second clutch being provided with third conduit means for supplying hydraulic fluid from said pump means thereto in the reverse position of said selector, said third conduit means having a branch extending to said second damped valve means independently of said switchover means for superimposing the delivery pressure of said pump means upon the last-mentioned spring force in said reverse position.

20. The combination defined in claim 19, further comprising differential valve means connected to said branch and said channel for alternately directing the hydraulic fluid therefrom to said second brake via said second damped valve.

21. The combination defined in claim 19, further comprising differential valve means connected to said second conduit means and said branch for exclusively admitting the larger one of said delivery and speed-dependent pressures to said second slider means in aiding relationship with said last-mentioned spring force.

22. The combination defined in claim 17, further comprising a master valve downstream of said pump means having pressure-reducing means provided with a hydraulic connection to said throttle valve for causing load-dependent variations in the delivery pressure of the hydraulic fluid fed to said frictional coupling means.

23. The combination defined in claim 22 wherein said hydraulic connection is blocked by said flow-control means in said reverse position whereby said delivery pressure is made substantially equal to the output pressure of said pump means.